March 29, 1966  L. I. PETERSEN  3,243,054
LOADING ARRANGEMENT FOR VENEER PRESSES
Filed March 25, 1964

INVENTOR
LAURITS INGVARD PETERSEN

BY Dicke + Craig
ATTORNEYS

United States Patent Office 3,243,054
Patented Mar. 29, 1966

3,243,054
LOADING ARRANGEMENT FOR VENEER PRESSES
Laurits Ingvard Petersen, 4 Platanvej, Copenhagen, Denmark
Filed Mar. 25, 1964, Ser. No. 354,640
Claims priority, application Denmark, Mar. 27, 1963, 1,387/63
5 Claims. (Cl. 214—1)

The present invention relates to improvements in loading arrangements for use with a veneering press having at least two press platens between which a daylight is provided.

It is a purpose of the invention to provide a loading arrangement of the type referred to which is operable to accurately deposit a workpiece on the lower press platens within said daylight.

A further purpose of the invention is to provide a loading arrangement which is operable to convey at least one workpiece from a position outside said daylight to a position between said press platens and to deposit said workpiece on the lower press platen.

A further purpose of the invention is to provide a loading arrangement having supporting means operable to be projected to a position between the said press platens for the depositing of a workpiece and to be retracted to a position outside said daylight for receiving further workpiece to be deposited between the platens.

Still a further purpose of the invention is to provide a loading arrangement of the type referred to operable to remove said workpiece from the position between the press platens to a position outside said daylight substantially opposite the position where the said supporting means receive the said workpiece.

Another object of the invention is to provide a loading arrangement having supporting means operable to be retracted from a position between said press platens and means operable to simultaneously advance a workpiece supported on said supporting means at a speed relatively to the supporting means which is equal to and directed oppositely to the retraction speed of the said supporting means relatively to the press platens.

Figure 1:
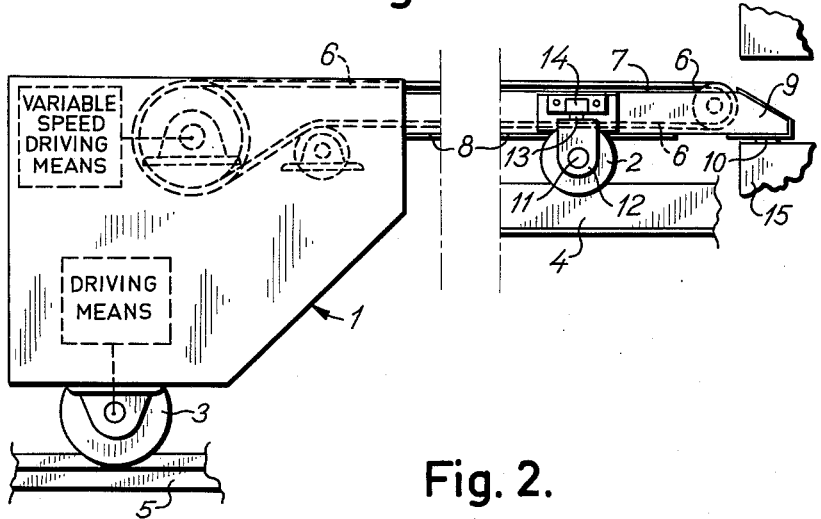
Figure 2:
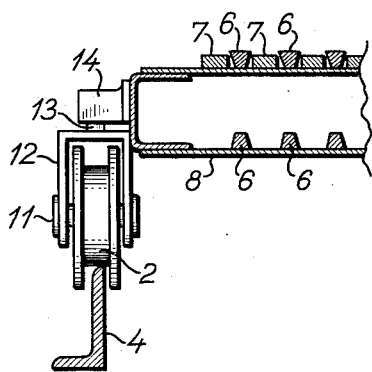
Figure 3:
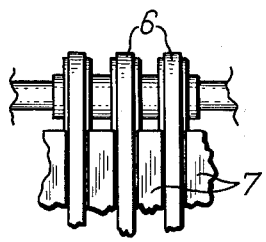

Still further purposes of the invention will appear from the specification as it proceeds with reference to the accompanying drawing, in which:

FIGURE 1 schematically shows a side elevation of an embodiment of the loading arrangement according to the invention, FIGURE 2 in cross sectional view a detail of the loading arrangement according to FIGURE 1, and FIGURE 3 a detail of the loading arrangement according to FIGURE 1 seen from above.

In general terms, the invention provides a loading arrangement to be used in connection with a veneering press of the type having at least two press platens 15 between which a daylight is provided. Thus, the arrangement is operable to supply a substantially plane workpiece from a position outside said daylight to a position between said press platens 15. The arrangement comprises a loading table, generally referred to by 1, on which said workpiece can be supported, and means 3, 5 operable to move the loading table 1 with the workpiece supported thereon to a position inside said daylight. The loading table is provided with an endless belt system 6. Furthermore, the arrangement comprises means 3, 5 operable to retract the loading table 1 from the position within the said press daylight and means for simultaneously operating said belt system 6 at a speed synchronized with said table retraction to effectively release said workpiece from the table by means of said belt system with substantially the same mutual relationship relatively to the press platens 15.

More specifically, with reference to the accompanying drawing, the shown embodiment of a loading arrangement according to the invention comprises a loading table, generally 1, supported on wheels or rollers 2 and 3, which are adapted to move along rails 4 and 5. Each of the wheels or rollers 2 and 3 shown in FIGURE 1 represents a pair of rollers mounted in transverse alignment and supported on parallel rail tracks. As it will be understood, the two pairs of rollers may be supplied by any plurality of pairs of rollers in agreement with the load to be carried by the loading Table 1.

The table, as shown in FIGURE 1, may be made of metal plate and comprise a box-like structure (shown to the left in FIGURE 1) surrounding the various driving means and an elongated, flat, relatively thin table top (shown to the right in FIGURE 1).

On the table a plurality of endless belts 6 are supported on suitable pulleys, said pulleys being mounted on a common axle. The belts are preferably V-belts supported on V-belt pulleys. The upper runs of the said belts 6 are supported on the flat upper part of the hollow portion of the table top, as shown in FIGURE 2 and at the right in FIGURE 1, and are kept in their mutual sidewards position by a plurality of guide ribs 7 substantially occupying the space between the belts 6 and forming channels therefor. The ribs 7 furthermore serve as supporting means for the workpiece or load carried by the loading table and have a height which is slightly smaller than the height of the belts 6. The difference in height may be of the order of 1 mm. The ribs 7 are preferably manufactured from hard wood or other similar material.

The lower runs of the belts 6 are enclosed in the hollow portion of the table top shown in FIGURE 2 and at the right in FIGURE 1 so as to be protected in downward direction by a metal plate 8 forming the lower part of this hollow portion. The lower and upper parts just referred to are connected by side wall portions of which one is shown in FIGURES 1 and 2. The purpose of the protection will be described hereinbelow.

The forward end of the table top (to the right side in FIG. 1) is provided with a nose-shaped leading portion 9 having an upward facing inclined surface adapted to act as a skid for workpieces leaving the table top. Under the nose-shaped portion 9 brushing means 10 is provided, e.g., in the form of a felt rib.

The wheels or rollers 2 are supported on individual shafts 11 mounted in fork shaped supporting means 12. At its upper end, the fork shaped supporting means 12 is provided with a studbolt 13 engaging a correspondingly threaded aperture in a sidewardly projecting block 14 fixedly mounted on the table top. The level of the forward end 9 of the table top can thus be adjusted relatively to the rail 4 by screwing the stud-bolt 13 more or less into the threaded aperture in the block 14.

The loading table is furthermore provided with suitable means for moving the belts 6. Preferably, these means comprise a continuously variable speed regulation device. Also, a suitable driving mechanism comprising an oil-hydraulic coupling device is provided for projecting and retracting the loading table along the rails 4 and 5 in such a manner that the starting and stopping of the table are gradual and soft.

The loading arrangement shown and described is operated in the following manner:

The workpieces which are to be transported to a position between the press platens 15, are placed on top of the belts 6. The workpiece may comprise a plurality of stacked veneer sheets provided with adhesive on all sides except the downward facing side of the lower sheet and the upward facing side of the upper sheet. If the workpieces are relatively small, the first workpiece is placed on the back end of the table top whereafter the belts are driven a certain distance forward to provide free space for the next workpiece, etc., until substantially the entire upper surface of the table top is covered with workpieces. The table is hereafter projected to a position where the relatively thin part is placed between the press platens 15. During this forward movement, the nose shaped portion 9 pushes out the already treated workpieces resting on the lower press platen 15, the level of the said portion 9 being adjusted by means of the screw devices 13, 14 so that the portion 9 will hit the finished workpieces substantially along a middle line of their edges. Thus, the level of the leading portion 9 can be adjusted to suit any thickness of the finished workpiece.

During the forward movement of the table 1, the brush means 10 sweeps the upper surface of the lower press platen 15 so that it is left clean for the next series of workpieces to be placed thereon.

In many veneer presses, the press platens are heated to relatively high temperatures, e.g., by means of overheated steam, and as the lower runs of the belts are placed at a small distance from the heated lower press platen, it is important that the belts are protected against the heat by means of the plate 8. When the table is projected to its forwardmost position, it is retracted while simultaneously the belts are moved forwards so as to release the workpieces thereon over the inclined nose portion 9 of the table. The moving speed of the belts is so adjusted that the upper runs do substantially not move relatively to press platens, so that the workpieces are put smoothly on the lower platen. Thus, the workpieces will not be dragged along the platen, which might otherwise cause scratches, and because of the inclined surface of the leading portion 9, the fall of the workpieces from the loading table to their resting position on the lower press platen is very little and will not cause any damage to the workpieces either. When the loading table is fully retracted, the workpieces are placed on the platen 15 in a mutual relationship equal to their mutual placing on the tabletop before the loading cycle was commenced.

Hereafter, the pressing operation may take place, and the loading cycle be repeated. The finished workpieces which are pushed out of the daylight may be conveyed to further treatment or packing by any suitable conveyor means, such as a traditional belt conveyor.

While in the foregoing the invention has been described in great detail with reference to the accompanying drawings, it will be obvious that the invention is not limited to the embodiment shown and described but that a plurality of features may be changed within the scope of invention.

Thus, the level adjustment device 13, 14 may be substituted by any similarly functioning device known in the art. As indicated in the left side of FIGURE 1 (in dotted lines) additional pulleys may be provided for tightening the belts 6.

The total operation cycle of the loading table may be manually or automatically controlled, and safety control means for ascertaining that the press platens 15 are not moved towards each other when the loading table is wholly or partly occupying the space between the platens may furthermore be provided. Also, a cooling device, e.g., a ventilator may be inserted in the table top to further ensure that the belts 6 are not harmed by the heat radiated from the press platens 15.

I claim:

1. For use with a veneering press having at least two press platens between which a daylight is provided, a loading arrangement operable to supply a substantially plane workpiece from a position outside said daylight to a position between said press platens comprising in combination:

a hollow loading table having an upper part provided with spaced rib means, said hollow table being effective to support said workpiece outside said press, said table further comprising a lower part parallel to and connected with said upper part by wall means, means operable to move said table with said workpiece supported thereon to a position inside said daylight, a plurality of endless V-belts supported by said table, the upper runs of said belts being disposed on said upper part of said table between said rib means and in contact with said upper part, the lower runs of said belts being supported by said lower part, means operable to retract said table from its position within said press daylight, and means for simultaneously operating said belts to effectively deposit said workpiece inside said daylight, the speed of said workpiece while being deposited being substantially zero in horizontal direction.

2. For use with a veneering press having at least two horizontal press platens operable to be opened and thereby provide a free interspace, a loading arrangement operable to supply a substantially plane workpiece from a position outside said interspace to a position between said press platens comprising in combination:

a hollow loading table having an upper plane part and a lower plane part and wall means connecting said part, a plurality of endless belts operable to support said workpiece outside said press, one of the runs of each of said belts being supported on said upper plane part and another of said runs being supported on said lower plane part, a plurality of guiding means provided between said belts on said upper plane part, means operable to move said belts and said guiding means horizontally with said workpiece supported thereon to a position inside said interspace, means operable to retract at a certain speed said belts and said guiding means from their position within said press interspace, and means for simultaneously operating said belts to effectively deposit said workpiece within said interspace at a horizontal speed of said workpiece which is substantially zero, 3. For use with a veneering press having at least an upper and a lower press platen between which a daylight is provided, a loading arrangement operable to supply a substantially plane workpiece from a position outside said daylight to a position on top of said lower press platen comprising in combination:

a hollow loading table having top and bottom horizontally extending plate portions connected by wall means, said table being adapted to support said workpiece outside said press, means operable to move said table with said workpiece supported thereon to a position inside said daylight, means operable to effectively sweep said lower press platen during said movement of said table, an endless belt system comprising an upper run supported on said top portion and a lower run disposed within said hollow table, means operable to retract said table from its position within said press daylight, and means for simultaneously operating said belt system at a speed synchronized with said table retraction to effectively deposit said workpiece on said lower press platen by means of said belt system.

4. For use with a veneering press having at least an upper and a lower press platen between which a daylight is provided, a loading arrangement operable to supply a substantially plane workpiece from a position outside said daylight to a position between said press platens comprising in combination:

a hollow loading table operable to support in a receiving position said workpiece outside said press, means operable to effectively adjust the vertical position, of said table, means operable to horizontally displace said hollow table with said workpiece supported thereon to a position inside said daylight, an endless belt system comprising pulleys supported interiorly of said hollow table, said table comprising an upper portion having a plurality of guide means thereon, and a lower portion connected by wall means to said upper portion, said belt system comprising belt portions disposed between said plurality of guide means, and further belt portions disposed interiorly of said hollow table, means operable to retract said table from its position within said press daylight, means for simultaneously operating said belt system at a speed synchronized with said table retraction to effectively deposit said workpiece on said power press platen by means of said belt system, and means operable to displace workpieces supported on said lower press platen from a position within said daylight to a position outside said daylight and substantially opposite said receiving position.

5. For use within a veneering press having at least two heatable press platens comprising a lower and an upper press platen between which a daylight is provided, a loading arrangement operable to supply a substantially plane workpiece from a position outside said daylight to a position between said press platens comprising in combination:

a hollow loading table comprising an upper and a lower metal plate portion connected by wall means, spaced guide means carried by said upper plate portion, operable to support said workpiece outside said press, means operable to move said table with said workpiece supported thereon to a position inside said daylight, an endless belt system comprising a plurality of V-belts having upper runs thereof disposed between said spaced guide means and lower runs carried by said lower metal plate portion, means effectively providing a screening of said belt system at least opposite said lower press platen, means operable to retract said table from its position within said press daylight, and means for simultaneously operating said belt system at a speed synchronized with said table retraction to effectively release said workpiece from said table by means of said belt system.

References Cited by the Examiner

UNITED STATES PATENTS

| | | | |
|---|---|---|---|
| 1,781,750 | 10/1930 | Dodge. | |
| 2,455,175 | 10/1948 | Hohl | 198—190 X |
| 3,045,274 | 7/1962 | Sohler | 15—352 X |

FOREIGN PATENTS 877,825  5/1953  Germany.

MARVIN A. CHAMPION, *Primary Examiner.*